July 3, 1928.

H. F. MARANVILLE 1,675,984

APPARATUS FOR REMOVING FABRIC STRIPS FROM CUTTING MACHINES

Filed April 10, 1920    3 Sheets-Sheet 2

Witness:

Inventor:
Harvey F. Maranville,

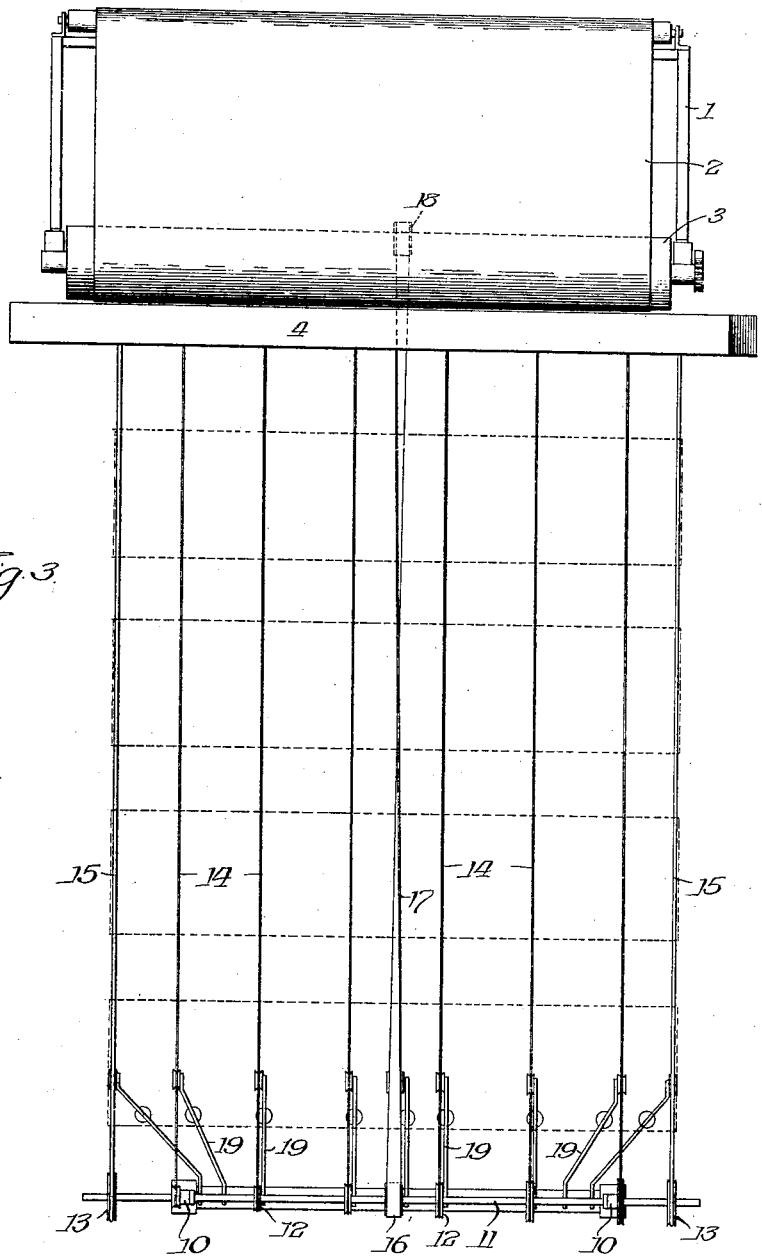

Patented July 3, 1928.

1,675,984

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

APPARATUS FOR REMOVING FABRIC STRIPS FROM CUTTING MACHINES.

Application filed April 10, 1920. Serial No. 372,988.

This invention relates to a device for removing cut fabric strips from the machine which severs them from the fabric roll. It is particularly adapted for use in tire factories and in conjunction with a machine for cutting strips "on the bias" or at an angle of 45° as required for the manufacture of tire casings. The apparatus is employed with the type of bias cutter known as the vertical bias cutter in which the fabric is allowed to hang vertically and then cut by a traveling blade moving at an incline.

Heretofore, there has been no method, as far as known to me, which has been perfected for mechanically removing the strips from the machine, the practice being to employ an operator standing at the front of the machine who grasps the fabric as it is released by the machine, and throws it on any suitable conveyor mechanism, or other receptacle provided for it.

This operation is hard work and is unsatisfactory, as in handling the cut fabric the operator is liable to get it twisted, and wherever the fabric comes together it will stick, owing to the rubber coating, and is difficult to separate in the later operations of assembling. Fabric so twisted and stuck together is hard to use and is frequently injured so as to be unsatisfactory for tire building.

The construction of a mechanical device for removing the fabric from this type of machine is highly desirable and fills a want which has been recognized in rubber factories but has not been supplied prior to my invention thereof.

In the drawings there is shown one form of my device in combination with a vertical bias cutter, but it is understood that my invention is applicable to various types of bias cutters, and may be used in appropriate combinations. It is also to be understood that the details of construction are not essential and may be varied without affecting the principles or nature of the invention.

Fig. 3 is a plan view.

Fig. 4 is a detail of the driving shaft.

Figure 1:
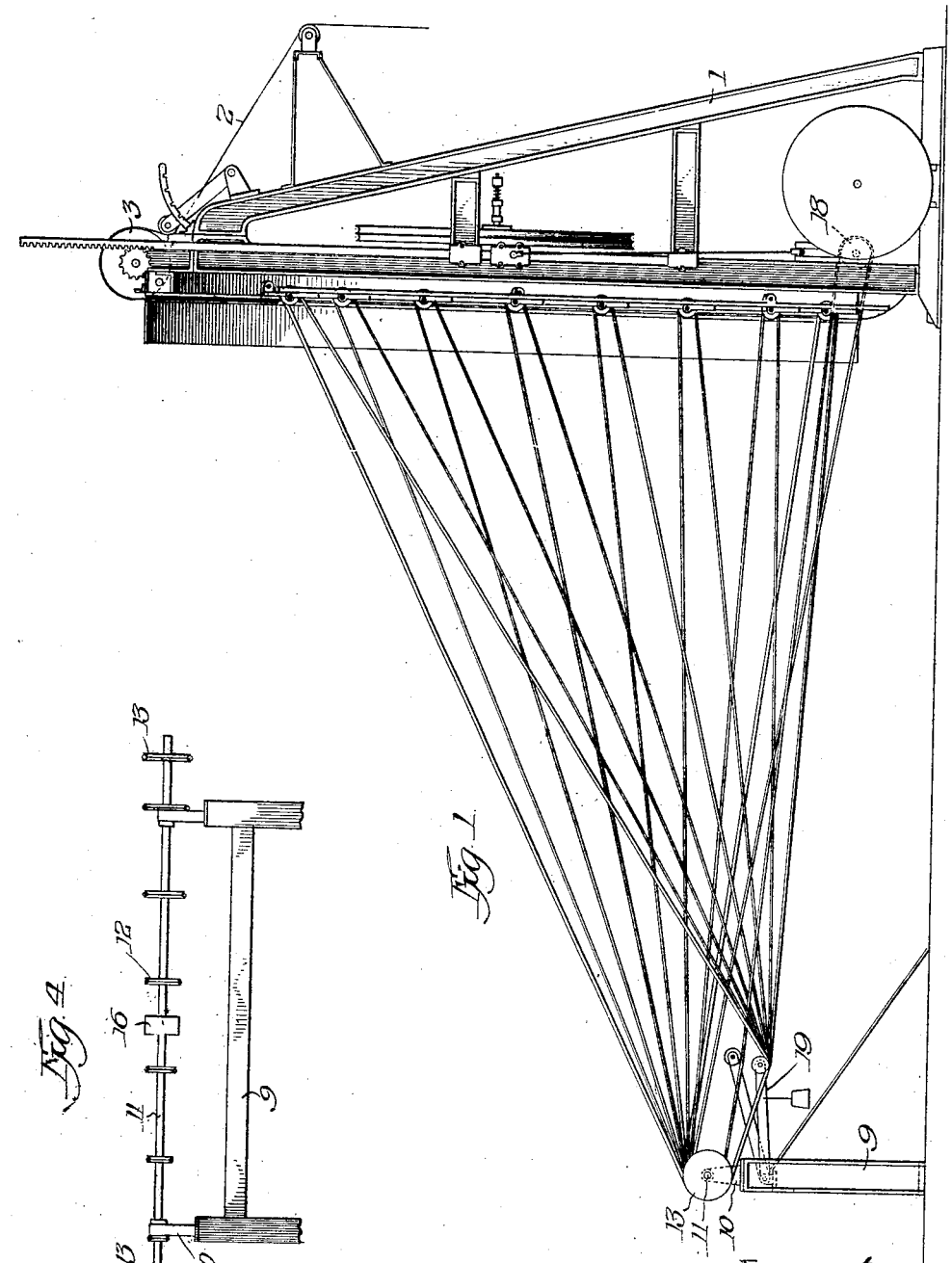
Fig. 1 is a side elevation of a combination of a vertical bias cutter and my take off or fabric removing device.
Figure 2:
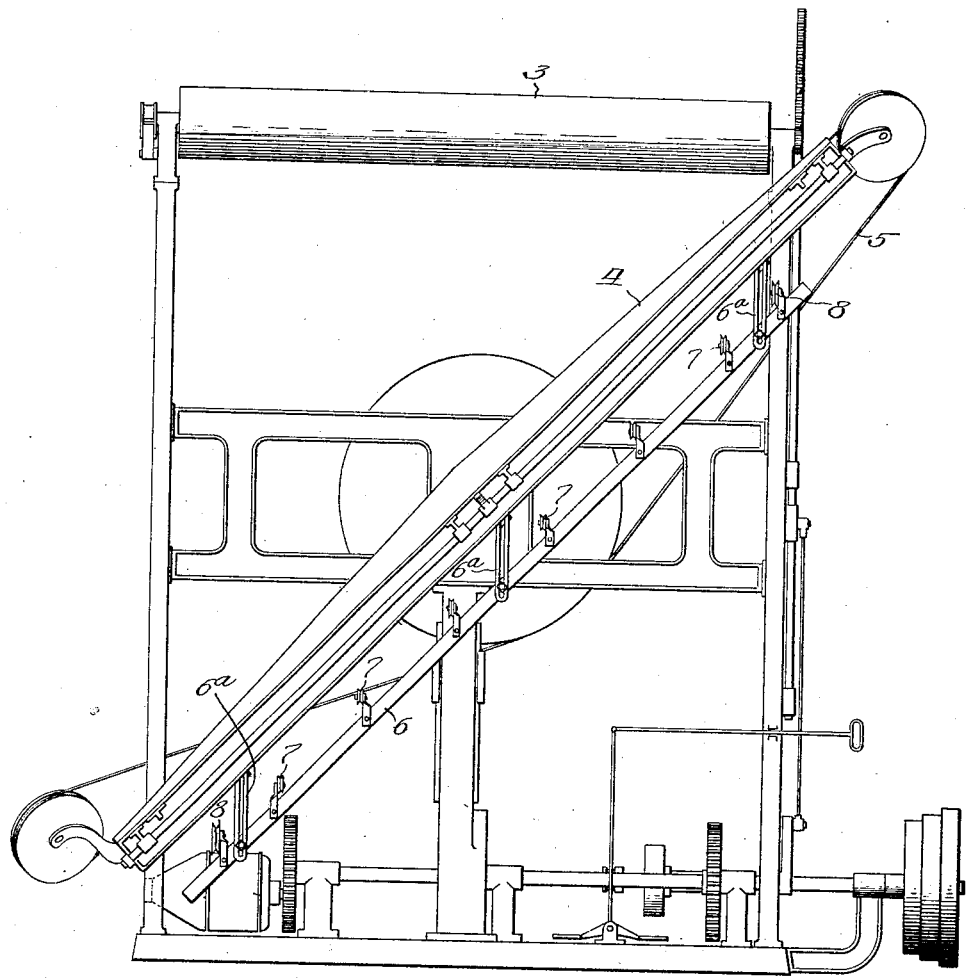
Fig. 2 is a front elevation of the bias cutter, the forward rolls and belts being removed.

In the drawings is shown one form of vertical bias cutter, which is an apparatus well known in the art and need not be described in detail, only sufficient description being given to enable an understanding of my invention.

The frame of the bias cutting machine is represented by the numeral 1 and the fabric by the dotted line 2, passing over a feed roll 3, and falling down over the face of the machine. At the front of the machine is located the cutter frame and clamping bar, the bar being indicated by the numeral 4. This bar is supported at any suitable angle, for this purpose being set at 45°, and is arranged to clamp the fabric against the frame of the machine, while a knife, supported by a reciprocating cable 5, cuts off the fabric depending below the bar. Between the times of action of the fabric clamping bar and the knife, the feed roller operates to pass fabric down over the face of the machine where it hangs by gravity until clamped by the bar 4. It will be seen that the fabric is delivered by the cutter in a vertical plane at an angle. This circumstance has made it difficult heretofore to construct a mechanism for removing the fabric from the machine.

Across the face of the machine below the clamp bar is mounted a bar 6 parallel to the clamping bar, this bar supporting a plurality of rotatable pulleys or sheaves 7, and two larger sheaves 8 arranged at the ends of the bar. The bar 6 is mounted on the slotted hangers 6ª so as to be adjustable toward and away from the cutting point to accommodate different width strips.

At the point in front and spaced a suitable distance from the machine is a framework or standard 9 on the upper surface of which is located a pair of aligned bearings 10 supporting a horizontal shaft 11. On this shaft are arranged a number of smaller pulleys 12 corresponding to the pulleys 7 and two larger pulleys 13 corresponding to the pulleys 8, arranged at the ends of the shaft 11. Over the pulleys 7 and 12 is led a plurality of belts or straps 14, and over the pulleys 8 and 13 are led heavier belts 15.

The shaft 11 is driven by a pulley 16 over which passes a belt 17 driven from a pulley 18 actuated by any desired or suitable moving part of the cutter mechanism. The driven shaft 11 has a non-rotative connection with each of the conveyor pulleys and thus serves to drive the conveyor in a manner clearly understood. The several belts may be kept in taut condition by belt tighteners 19. While six belts or straps 14 have been illustrated, it is to be understood that any desired number may be used without affecting the efficient operation of the conveyor. Each belt is entirely separate and independently mounted and constitutes in itself a complete conveyor.

It will be noted that the pulleys 12 and 13 on the drive shaft decrease in circumference as they approach the lower side of the cutter bar, this being for the purpose of compensating for the increasing distance from the shaft to the upper sheaves, each belt traveling at a slightly increased speed over the next lower belt. By this means the piece of fabric as it is carried on the belts will reach a horizontal position over the shaft 11 parallel to the shaft.

The heavy belts 15 trained over the large end pulleys 8 and 13 serve to maintain the suspended end portions of the strips at a suitable distance apart and also prevent the remaining conveyor belts from being drawn in by the free discharging ends of the strips.

The operation of the device will be readily understood, it being observed that as the fabric is cut from the machine it falls on the belts, which, as they move forward, bring the strips to horizontal position in parallel relation and in position to be booked or handled in any other manner as may be found desirable. By this device is avoided the laborious operation of removing the strips by hand, and the fabric may be quickly and easily taken from the machine without wrinkle or twisting.

It will be understood that changes and modifications may be made within the present invention and within the scope of the claims.

I claim:

1. In a device of the character set forth, the combination of a machine for cutting fabric on an angle and while in a vertical plane, of a conveyor to receive the fabric after it has been cut and to support the fabric in a horizontal plane, the conveyor being so constructed as to bring said fabric gradually to a horizontal position.

2. In a machine of the character set forth, a cutting device adapted to sever fabric at an angle and while in vertical position, a plurality of belts constituting a conveyor, said belts being arranged with their ends parallel to line of said cut and approaching a horizontal line as they move from the cutting point.

3. In a machine of the character set forth, a cutting device adapted to sever fabric at an angle and while in vertical position, a plurality of belts constituting a conveyor, said belts being arranged with their ends parallel to line of said cut and approaching a horizontal line as they move from the cutting point, the speed of said belts varying as their length.

4. In an apparatus of the character described, a knife for cutting fabric on an angle while in a vertical plane, a plurality of pulleys arranged at an angle under said knife, a similar number of pulleys arranged in a horizontal plane, and belts passing over said pulleys.

5. In an apparatus of the character described, a knife for cutting fabric on an angle while in a vertical plane, a plurality of pulleys arranged at an angle under said knife, a similar number of pulleys arranged in a horizontal plane, and belts passing over said pulleys, the speed of said belts varying as their lengths.

6. The combination in a machine of the class described, of means for cutting a sheet of material into strips, and a narrow conveyor so disposed relative to said cutting means as to receive the cut strips at substantially their middle parts, said strips being uniformly spaced for delivery at points along the length of the conveyor.

7. The combination in a machine of the class described, of means for cutting a sheet of material into strips, a narrow conveyor disposed relative to said cutting means to receive the cut strips at substantially their middle parts, the end portions of said cut strips being freely suspended and separated for delivery at points along the length of the conveyor.

8. A fabric cutting machine having in combination a pulley journalled in said machine, a cutter, a support remote from said cutter provided with a pulley in alignment with said first mentioned pulley, an endless conveyor engaging said pulleys and disposed to receive the strips from said cutter, means associated with said conveyor for maintaining the suspended end portions of said strips at a suitable distance apart, and means connected to one of said pulleys for driving said conveyor.

HARVEY F. MARANVILLE.